(12) United States Patent  
Ervin, Jr.

(10) Patent No.: US 9,185,059 B1  
(45) Date of Patent: Nov. 10, 2015

(54) MANAGEMENT OF JOURNALING DESTINATIONS

(71) Applicant: Jackie Lee Daniel Ervin, Jr., Valencia, CA (US)

(72) Inventor: Jackie Lee Daniel Ervin, Jr., Valencia, CA (US)

(73) Assignee: Globanet Consulting Services, Sherman Oaks, CA (US)

( * ) Notice: Subject to any disclaimer, the term of this patent is extended or adjusted under 35 U.S.C. 154(b) by 198 days.

(21) Appl. No.: 13/783,101

(22) Filed: Mar. 1, 2013

(51) Int. Cl.  
*G06F 15/16* (2006.01)  
*H04L 12/58* (2006.01)

(52) U.S. Cl.  
CPC ...................................... *H04L 51/00* (2013.01)

(58) Field of Classification Search  
None  
See application file for complete search history.

(56) References Cited

U.S. PATENT DOCUMENTS

| | | | |
|---|---|---|---|
| 7,913,053 B1* | 3/2011 | Newland | 711/172 |
| 8,935,275 B2* | 1/2015 | Rathod | 707/769 |
| 9,009,351 B2* | 4/2015 | Lavoie et al. | 709/246 |
| 2007/0038714 A1* | 2/2007 | Sell | 709/206 |
| 2008/0033905 A1* | 2/2008 | Stokes | 707/1 |
| 2008/0109448 A1* | 5/2008 | Aboel-Nil et al. | 707/10 |
| 2010/0115059 A1* | 5/2010 | Youill et al. | 709/219 |
| 2012/0109898 A1* | 5/2012 | Baessler et al. | 707/665 |

* cited by examiner

*Primary Examiner* — Mohamed Ibrahim  
(74) *Attorney, Agent, or Firm* — Knobbe Martens Olson & Bear LLP

(57) ABSTRACT

Generally described, the present application corresponds to the management of journaling messages in a messaging environment. A set of electronic messaging clients can be associated with a designated journaling destination that may be different from a default journaling destination associated with each individual messaging client. Additionally, the messaging environment can alternate between multiple designated journaling destinations to increase the mail load that a single journal destination can manage. The messaging environment can evaluate journaling criteria to select alternate designated journaling destinations from a set of available alternate journaling destinations.

20 Claims, 6 Drawing Sheets

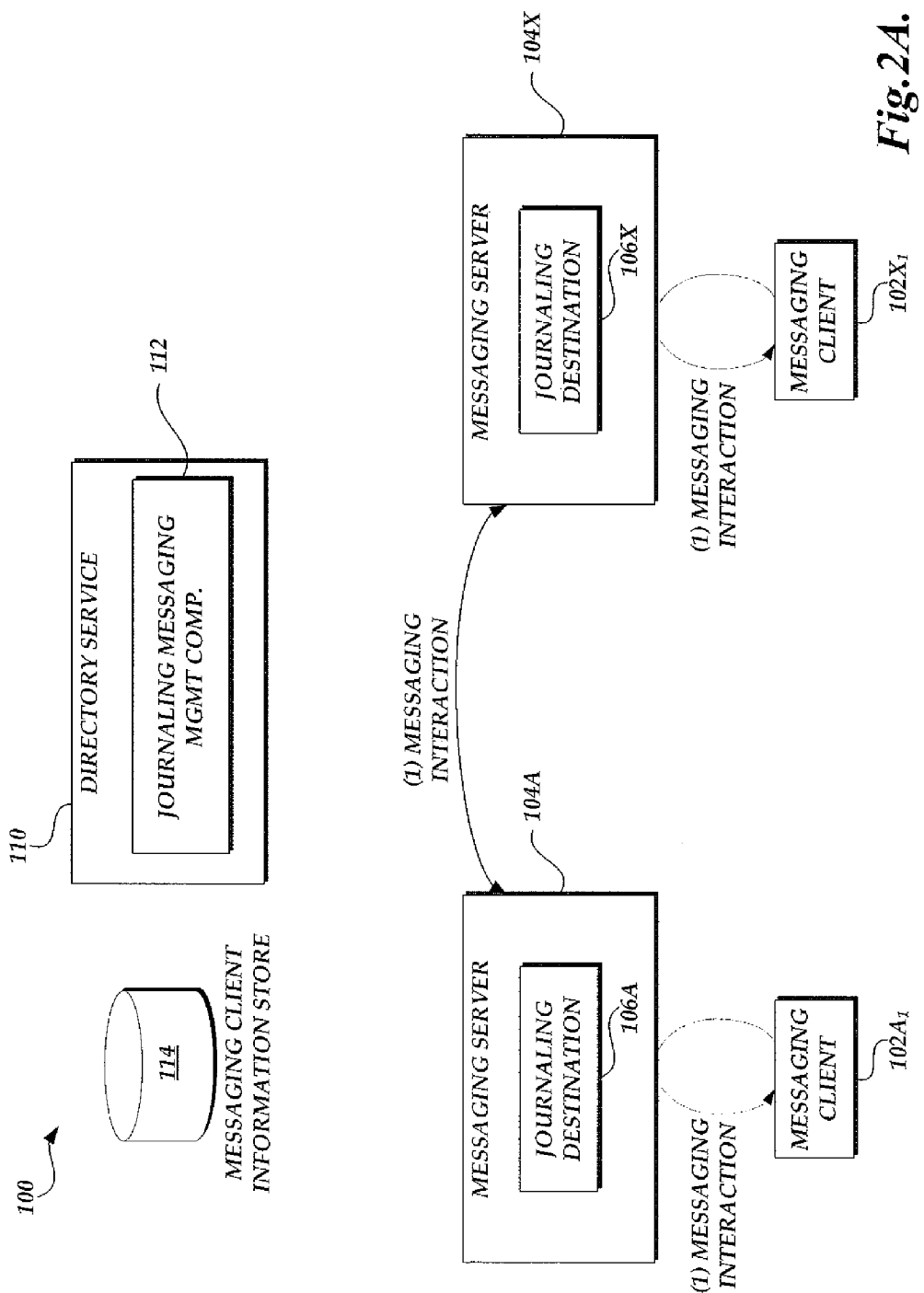

MANAGEMENT OF JOURNALING DESTINATIONS

BACKGROUND

Generally described, electronic messaging platforms, such as Microsoft Corporation's Exchange messaging platform, can provide a mechanism to capture copies of electronic messages, such as electronic mail or email, generated or delivered to the electronic mail messaging platform. Typically, a server or servers in the messaging platform that maintains the rules governing the creation and delivery of the captured copies, which may be referred to as journal receipts or journaling messages. Journal rules contain a few properties, such as the delivery address and the scope of messages to determine which journal receipts should be generated.

Journal receipts are delivered to dedicated journaling destination, such as one or more mailboxes in the messaging platform, for storage and review. Organizations will architect the journaling infrastructure to accommodate the volume of email traffic that will be generated; higher volumes of email traffic will require more mailboxes and servers to process the journal stream. Many organizations will have multiple journal mailboxes. However, multi journal mailbox architectures introduce complexity and data duplication, leading to increased IT expenditures to manage and control electronic mail. For example, if end users that send email to each other are subject to journal rules, but journal to different journal mailboxes, then a separate journal receipt will be delivered to each journal mailbox, duplicating the journal receipt unnecessarily. This duplication manifests as increased message volume and storage consumption in the email system.

BRIEF DESCRIPTION OF THE DRAWINGS

FIGS. 2A-2D are block diagrams of the messaging environment of FIG. 1 illustrating various interactions of the components of the messaging environment.

DETAILED DESCRIPTION

Generally described, the present application corresponds to the management of journaling messages in a messaging environment. In an illustrative embodiment, aspects of the present application related to the management of journal destinations for messaging clients. Illustratively, a set of electronic messaging clients can be associated with a designated journaling destination that may be different from a default journaling destination associated with each individual messaging client. Additionally, the messaging environment can alternate between multiple designated journaling destinations to increase the mail load that a single journal destination can manage. Specifically, the messaging environment can evaluate journaling criteria to select alternate designated journaling destinations from a set of available alternate journaling destinations.

By way of illustrative example, aspects of the present application may be implemented in an electronic mail messaging environment. Electronic mails sent to and received from messaging client are evaluated according to journaling rules. If the electronic mail message is determined to be acceptable for journaling, a messaging server requests addressing information to determine the final delivery address for a journaling destination. During a lookup procedure, a server determines that a designated journaling destination has been assigned to messaging client, and the server sends the receipt accordingly. The designated journaling destination may apply to all of a set of messaging clients that would otherwise be associated with different default journaling destinations. Each time a message is to be delivered to the journaling destination, the lookup is performed. Additionally, a journaling management service monitors metric information associated with the designated journaling destination. The metric information can include a number of journaling messages that have been received by the designated journaling destination or an amount of time in which the designated journaling destination has been receiving messages. Based on the evaluation of journaling criteria, the journaling management service can select alternate designated journaling destinations. Illustratively, the journaling criteria can include thresholds related to a number of journaling messages received by the designated journaling destination or a threshold amount of time that the designated journaling destination should receive journaling messages. Illustratively, the journaling criteria can be set to allow for the processing of journaling messages while mitigating duplicative journaling messages.

Figure 1:
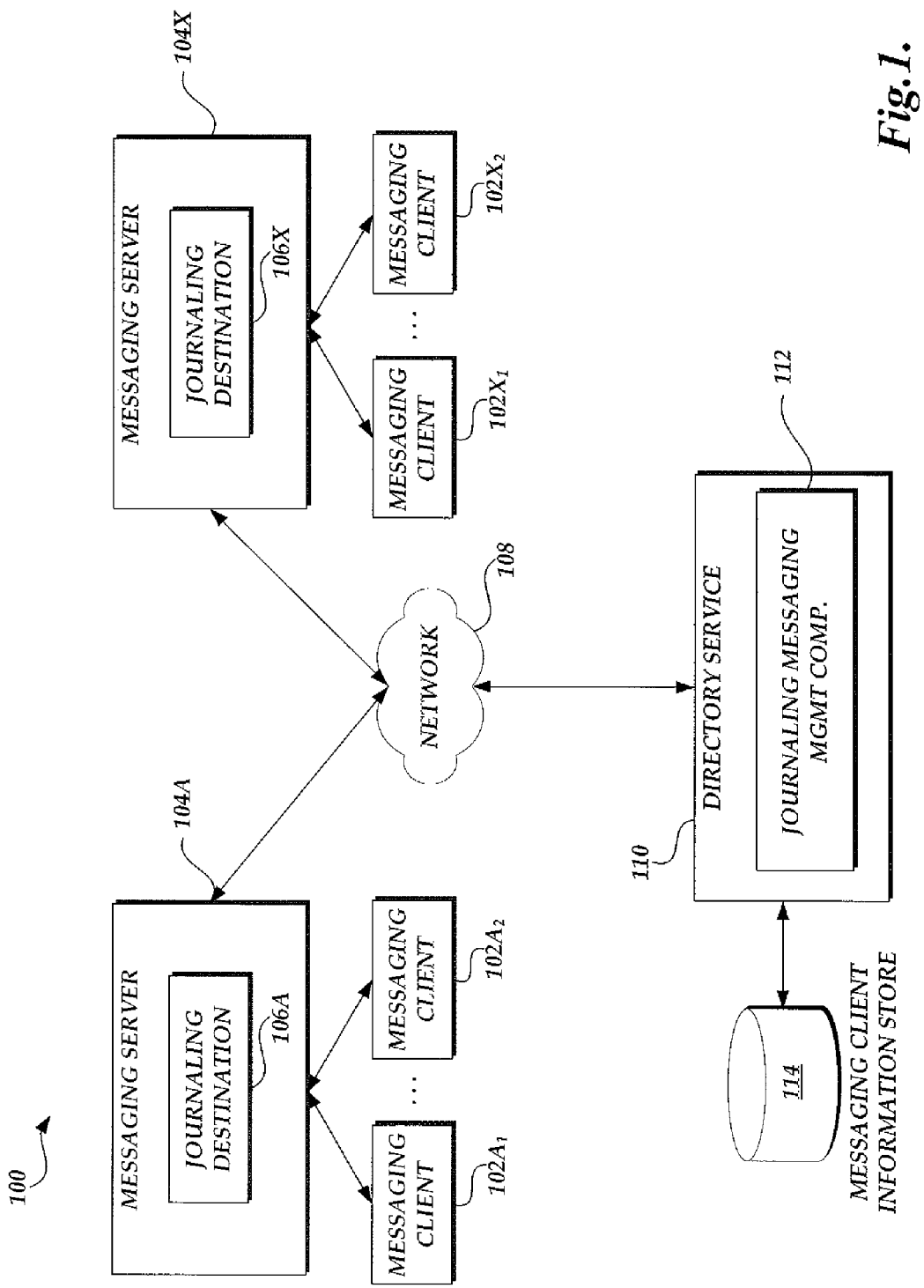
FIG. 1 is a block diagram depicting an illustrative messaging environment including a number of messaging clients, messaging servers, directory service and a journaling message management component.

FIG. 1 is a block diagram depicting an illustrative messaging environment 100 including a number of messaging clients 102, messaging servers 104, and a directory service 110. Illustratively, the messaging clients 102 can correspond to one or more software components implemented on a computing device for transmitting and receiving messaging. Illustratively, the messages can correspond to electronic mail messages or any type of communication (textual or multi-media) exchanged between two or more messaging clients. The messaging clients can be implemented on any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like. Additionally, one or more aspects of the messaging clients 102 may be implemented in a virtualized environment.

Illustratively, a set of messaging clients 102 are associated with messaging server 104. For example, messaging clients 102A1-102A2 are associated with the messaging server 104A and messaging clients 102X1-102X2 are associated with the messaging server 104X. While only two messaging servers, 104A and 104X are illustrated, any number of messaging clients may be implemented in the messaging environment 100. In one embodiment, at least a subset of the messaging servers 104 also implements one journaling destination 106 for receiving journaling stream messages. Illustratively, the journaling destination may correspond to a "mailbox" hosted on a messaging server 104. In some embodiments, each messaging server 104 does not need to host a journaling destination 106. Additionally, in other embodiments, a messaging server 104 may host multiple journaling destinations 106. Still further, in other embodiments, a separate journaling server (not illustrated) may be configured, at least part, to host journaling destinations for the messaging environment 100. The computing devices hosting the messaging servers 104 may be a server or other computing component including a network interface, memory, processing unit, and computer readable medium drive, all of which may communicate with each other by way of a communication bus. For example, an included network interface may provide connectivity over a network 108 and/or other networks or computer systems. A processing unit (as included may in any of the components discussed above) may communicate to and from memory containing program instructions that the processing unit executes in order to operate the storage management component, storage devices, and data stores. An included memory may generally include RAM, ROM, other persistent and auxiliary memory, and/or any non-transitory computer-readable media.

Illustratively, the network 108 may be any wired network, wireless network or combination thereof. In addition, the network 108 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

With continued reference to FIG. 1, the directory service may be one or more components hosted on a computing device (or set of computing devices) that provide address information for the journaling destinations associated with messaging clients 102. The directory service 110 can include a messaging client data store 114 that maintains information associated with the messaging clients. The information maintained by the messaging client data store 114 can include, but is not limited to, an identification of a default journal destination as defined in accordance with typical messaging architectures. Additionally, the messaging client data store 114 can include the identification of a designated journaling destination for messaging clients. Illustratively, the identification of a designated journaling destination will cause journaling stream messages to be delivered to the designated journaling destination instead of the default journaling destination.

The computing devices hosting the directory service 110 and messaging client data store 114 may be a server or other computing component including a network interface, memory, processing unit, and computer readable medium drive, all of which may communicate with each other by way of a communication bus. For example, an included network interface may provide connectivity over a network 108 and/or other networks or computer systems. A processing unit (as included may in any of the components discussed above) may communicate to and from memory containing program instructions that the processing unit executes in order to operate the storage management component, storage devices, and data stores. An included memory may generally include RAM, ROM, other persistent and auxiliary memory, and/or any non-transitory computer-readable media.

As illustrated in FIG. 1, the directory service 110 is also associated with a journaling message management component 112 for managing the selection of designated journaling destination for a set of messaging clients 102. Illustratively, the journaling message management component 112 can monitor various metrics for a currently designated journaling destination and determine whether an alternate designated journaling destination should be selected. If so, the journaling message management component 112 can select an alternate designated journaling destination and cause the modification of information in the messaging client data store 114. Although the journaling message management component 112 is illustrated as a component of the directory service 110, the journaling message management component 112 may be implemented independently of the directory service 100 such as a stand-alone component or as a component of another computing device.

With reference to FIGS. 2A-2D, illustrative interactions will be described for allocating managing the selection of designated journaling destinations and for the processing journaling stream messages. For purposes of illustration, FIGS. 2A-2D have been illustrated in a limited number of components. One skilled in the relevant art will appreciate, however, that the interaction between messaging clients 102, messaging servers 104, directory services and journaling message management component 112 may involve a number of additional components.

With reference to FIG. 2A, two or more messaging clients may interact to send or receive messages between the messaging clients, such as messaging clients 102A1 and 102X1. The messages are processed by the respective messaging servers 104A, 104X, which can include the evaluation of journaling rules that dictate whether copies of the messages should be added to a journal messaging stream. For purposes of the illustrative example, it can be assumed that the exchanged message should be subject to journaling based on the journaling rules of the messaging servers.

Figure 2B:
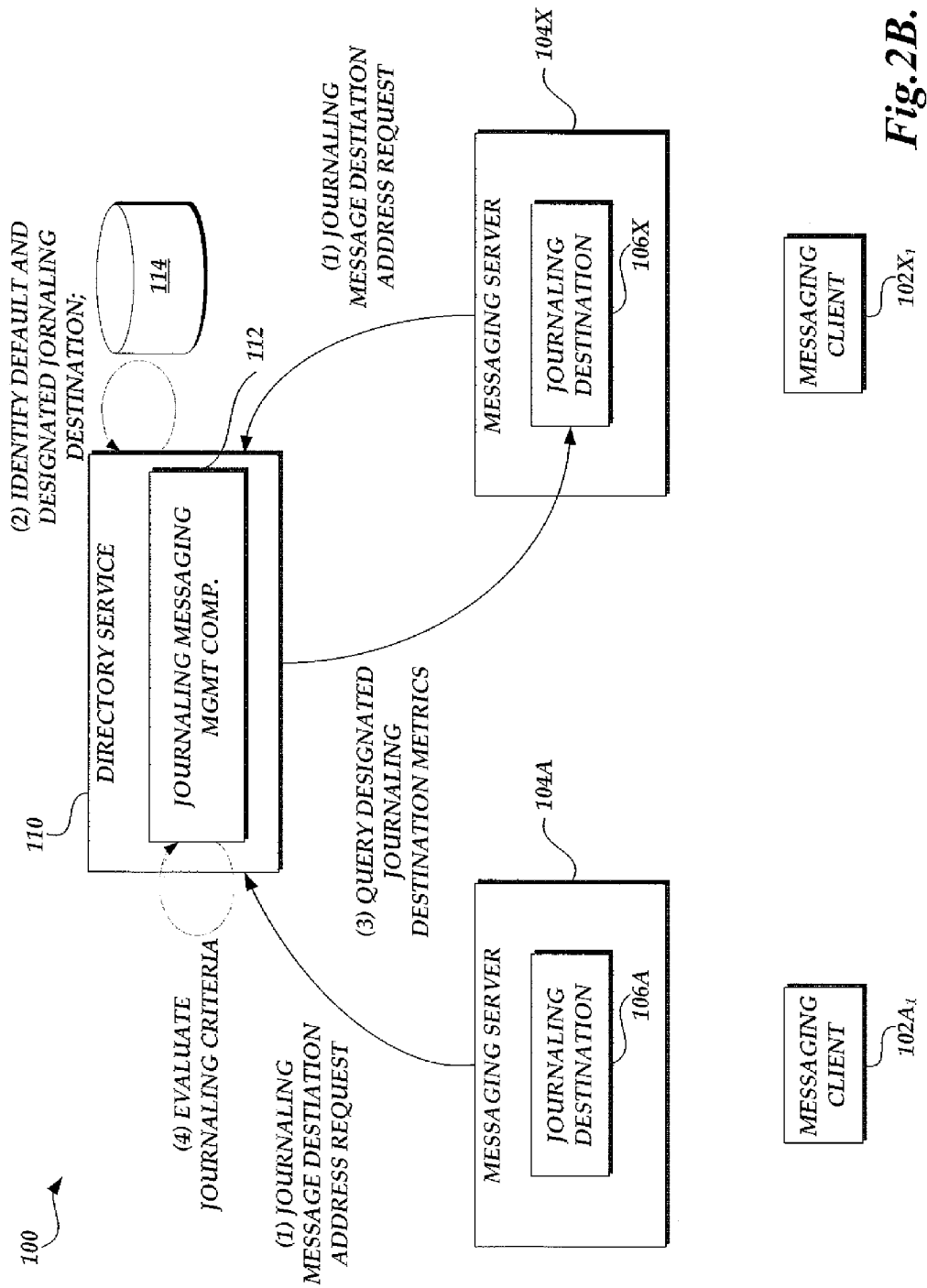

With reference to FIG. 2B, each messaging server 104A and 104X transmits a request to a directory service 110 to determine the address (or other identification information) of a journaling destination assigned to its respective messaging client 102. In accordance with a traditional embodiment, messaging client 102A1 would have been assigned to a default journaling destination 106A and messaging client 102X1 would have been assigned to a different default journaling destination 106X. Accordingly, both default journaling destinations would receive and process a copy of the message and the messaging environment 100 would have duplicative journaling messages.

In accordance with present application, however, the directory service 110 can determine that a designated journaling destination has been assigned for each of the identified messaging clients 102A1 and 102X1. For example, the directory service 110 can maintain information that identifies a designated journaling destination for each messaging clients. In this embodiment, however, each messaging client 102 in a set of messaging clients is associated with the same designated journaling destination regardless of which default journaling destination the messaging clients may have been assigned to previously. Accordingly, the journaling messages from each of the messaging clients 102A1 and 102X1 would now be sent to the same designated journaling destination. Since the same journaling stream message is sent to the same journaling destination, the duplicate messages can be processed to remove duplicate journaling stream messages.

In addition to the designation of a single journaling destination for a set of messaging clients 102, in another aspect, the journaling message management component 112 can also monitor metrics associated with a currently designated journaling destination to determination whether to select an alternate designated journaling destination. More specifically, in one aspect, the journaling message management component 112 can manage the number of journaling stream messages maintained at a designated journaling destination to facilitate additional processes, such as archival, or to manage the use of messaging server resources, such as memory, processing capacity, etc. In one embodiment, the journaling message management component 112 can utilize journaling criteria that can establish a threshold number of journaling stream messages that should be maintained at a currently designated journaling destination, an amount of time that a designated journaling destination should receive journaling stream messages, or both. The thresholds may be dynamically configured or adjusted to manage the performance of individual messaging servers 104 or the messaging environment 100.

With continuing reference to FIG. 2B, in one embodiment, responsive to the request for address information, the journaling message management component 112 queries the currently designated journaling destination to determine one or more metrics. Illustratively, the metrics queried by the journaling message management component 112 relate to the specific journaling criteria utilized by the journaling message management component 112. In other embodiments, the querying of the metric information from the designated journaling destination may be asynchronous to the receipt of an address request, such as a periodic polling of the designated journaling destination for metric information.

Figure 2C:
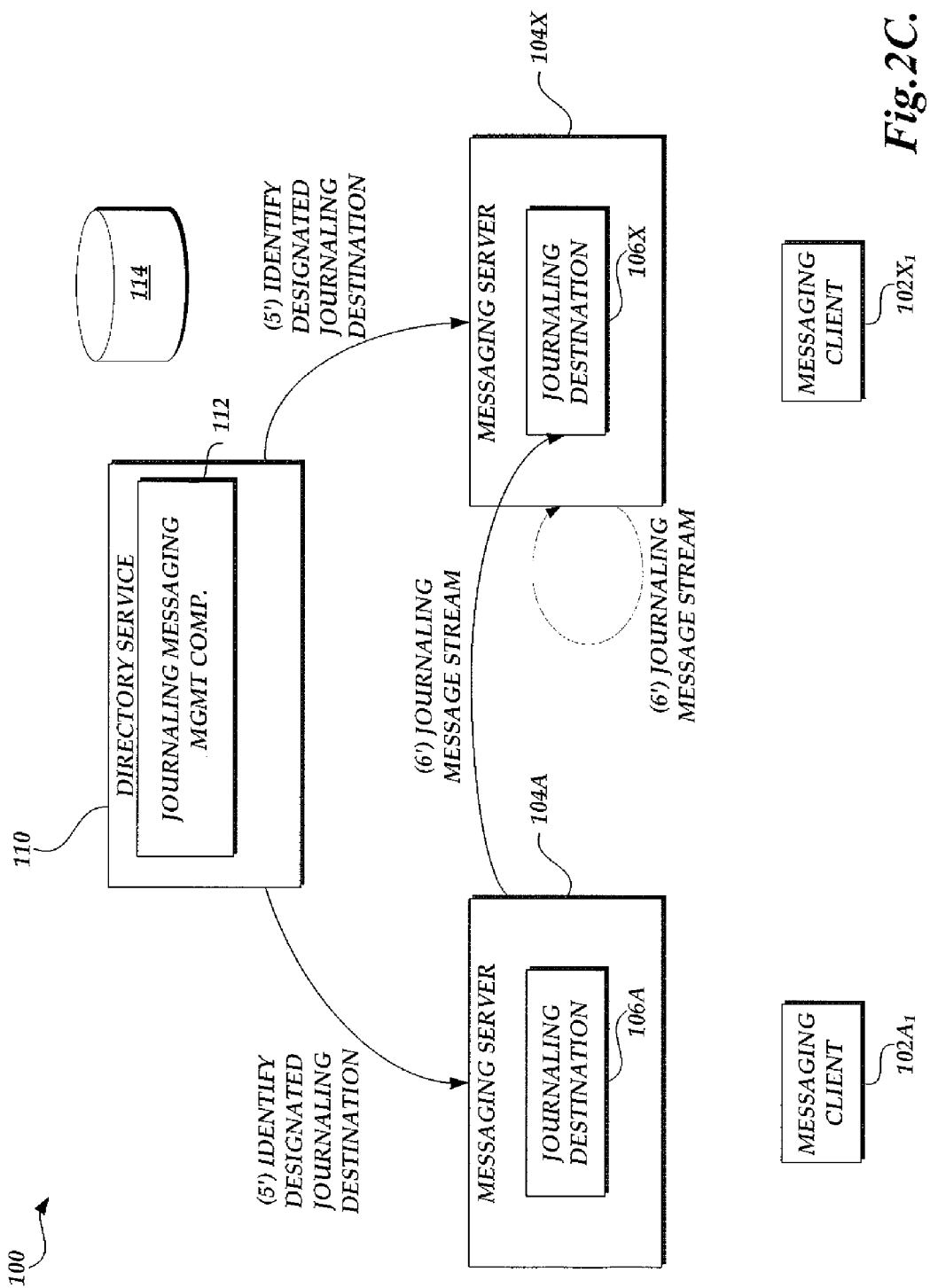

With reference to FIG. 2C, in one embodiment, the journaling message management component 112 may determine that one or more thresholds associated with the journaling criteria have not been exceeded. Accordingly, the journaling message management component 112 causes the transmission of the designated journaling destination to the requesting messaging servers 104. As illustrated in FIG. 2C, journaling destination 106X corresponds to the designated journaling destination for both messaging servers 104A and 104X. In this embodiment, the default journaling destination 106A for messaging client 102A1 does not receive the journaling stream message while journaling destination 106X continues to receive the journaling stream message from messaging client 102X1 because it functions as both the default and designated journaling destination.

Figure 2D:
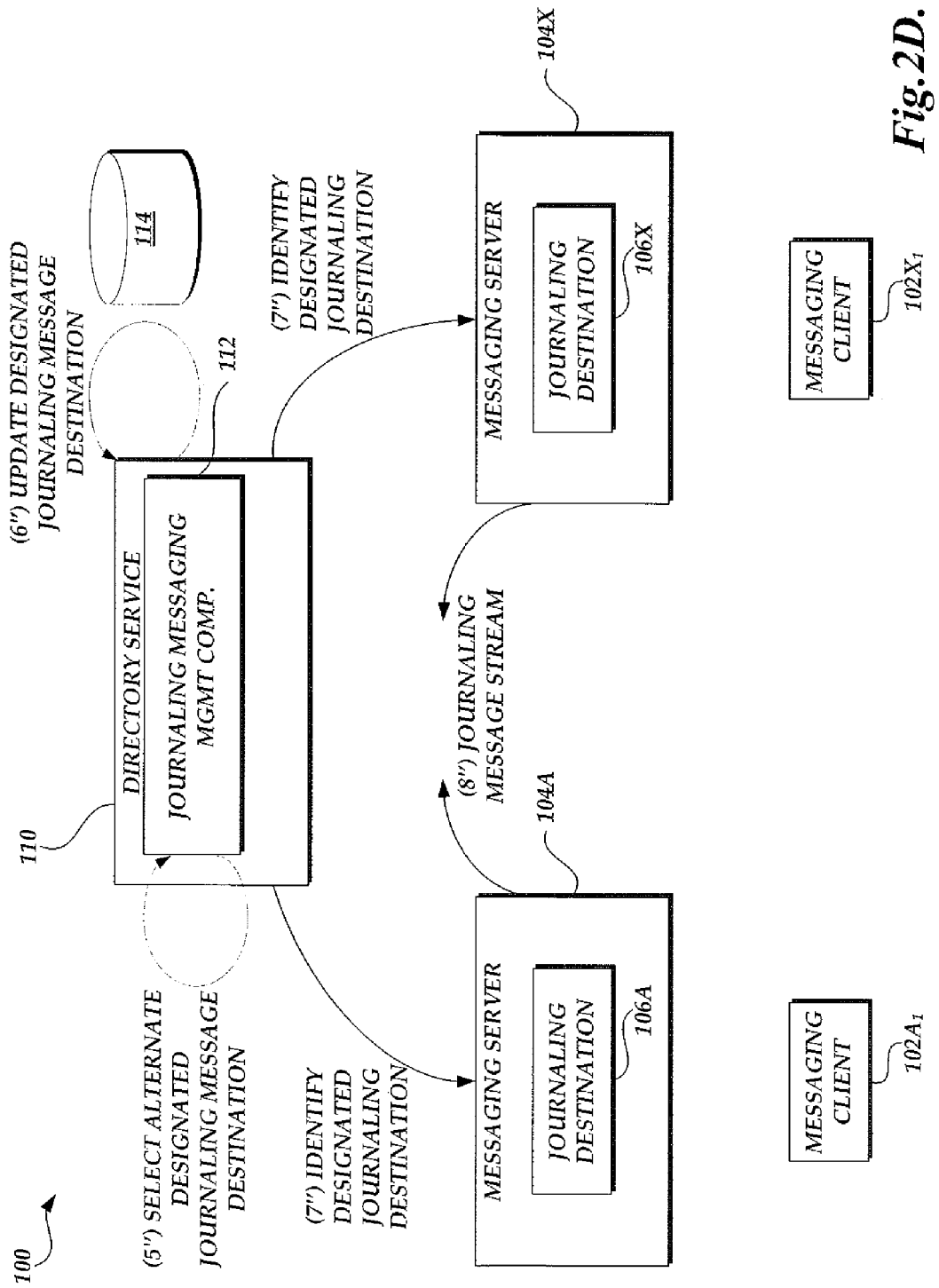

With reference to FIG. 2D, in another embodiment, the journaling message management component 112 may determine that one or more thresholds associated with the journaling criteria have been exceeded. In this embodiment, the journaling message management component 112 will attempt to select an alternate designated journaling destination. Illustratively, the journaling message management component 112 can maintain a set of alternate journaling destinations and select from the set of available alternate journaling destination. For example, the journaling message management component 112 can utilize a round-robin selection algorithm or a random selection algorithm. In another example, the journaling message management component 112 can utilize a weighted selection algorithm in which various factors, such as time, resource consumption capabilities, current load, excess capacity, and the like may be utilized to influence the selection of the alternate designated journaling destination.

If an alternate designated journaling destination is selected, the journaling message management component 112 can cause the modification of the information in the messaging client data store 114 to identify the selected designated journaling destination. Thereafter, the journaling message management component 112 causes the transmission of the updated designated journaling destination to the requesting messaging servers 104. As illustrated in FIG. 2D, in this embodiment a new journaling destination may be selected that does not correspond to the default journaling destination for both messaging servers 104A and 104X.

Figure 3:
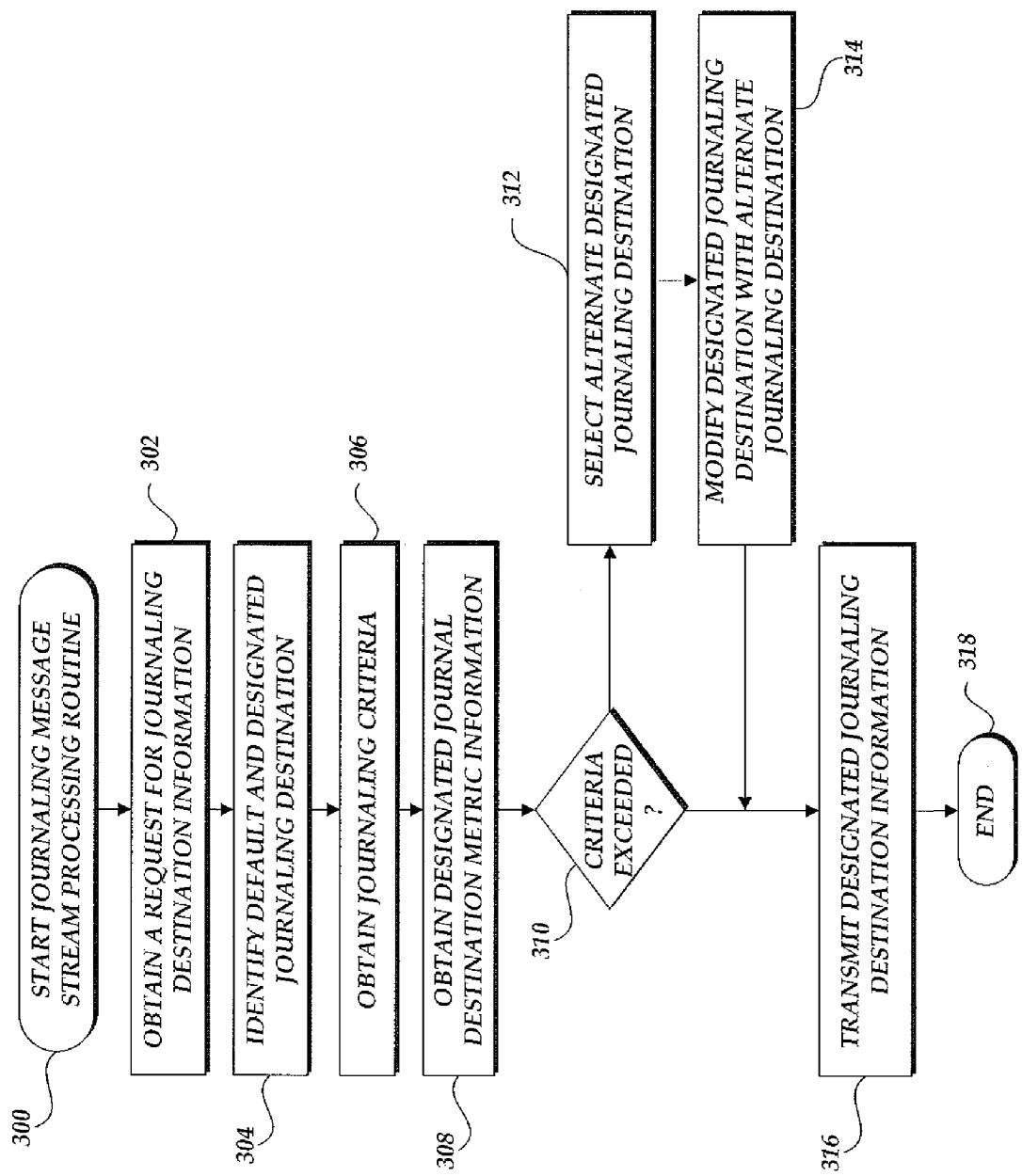
FIG. 3 is a flow diagram of a message stream processing routine implemented in a messaging environment.

Turning now to FIG. 3, a journaling messaging processing routine 300 implemented by the journaling message management component 112 (or other component) will be described. At block 302, a request for address information for a journaling destination is received from a messaging server 104. It is assumed that the messaging server has processed a message and determined that the message is subject to journaling rules. Upon receipt of the request, at block 304, a default and designated journaling destination are identified. As previously described, the identification of the default and designated journaling destinations may be provided by a directory service, such as directory service 110.

At block 306, journaling criteria are obtained. In one embodiment, the journaling criteria can establish a threshold number of journaling stream messages that should be maintained at a currently designated journaling destination, an amount of time that a designated journaling destination should receive journaling stream messages, or both. The thresholds may be dynamically configured or adjusted to manage the performance of individual messaging servers 104 or the messaging environment 100.

At block 308, metric information from the currently designated journaling destination is obtained. Illustratively, the metrics relate to the specific journaling criteria utilized by the journaling message management component 112 or other component and are obtained response to the request. In other embodiments, the querying of the metric information from the designated journaling destination may be asynchronous to the receipt of an address request, such as a periodic polling of the designated journaling destination for metric information.

At decision block 310, a test is conducted to determine whether the journaling criteria have been exceeded. If it is determined that the journaling criteria has not been exceed, at block 316, the address information for the currently designated journaling destination is transmitted to the requesting messaging servers 104. In contrast, if it is determined that the journaling criteria has been exceed, at block 312, an alternate designated journaling destination is selected. Illustratively, the journaling message management component 112 can maintain a set of alternate journaling destinations and select from the set of available alternate journaling destination. For example, the journaling message management component 112 can utilize a round-robin selection algorithm, random selection algorithm or a weighted selection algorithm. At block 314, the messaging client data store 114 is updated to reflect the selected alternate designated journaling destination. For example, the selected alternate designated journaling destination may replace the previously identified designated journaling destination. At block 316, the address information for the currently designated journaling destination (e.g., the updated designated journaling destination) is transmitted to the requesting messaging servers 104. At block 318, the routine 300 ends.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing electronic messages, the method comprising:
    obtaining on behalf of an electronic messaging client a first request for address information for a journaling stream destination associated with the requesting electronic messaging client, wherein the requesting electronic messaging client is associated with a default journaling stream destination;
    determining that an assigned journaling stream destination has been selected for the requesting electronic messaging client;
    transmitting a response to the first request identifying the assigned journaling stream destination, wherein the assigned journaling stream destination is different from the default journaling stream destination;
    evaluating configurable journaling criteria based on at least one of a number of journaling stream messages received at the designated journaling stream destination or an amount of time in which the designated journaling stream destination has received journaling stream messages from the set of electronic messaging clients;
    causing the designation of an alternate journaling stream destination for the set of electronic messaging clients based the evaluated configurable journaling criteria;
    obtaining on behalf of an electronic messaging client a second request for address information for a journaling stream destination associated with the requesting electronic messaging client;
    determining that the alternate journaling stream destination has been selected for the requesting electronic messaging client; and
    transmitting a response to the second request identifying the alternate journaling stream destination, wherein the alternate journaling stream destination is different from the default journaling stream destination for the second electronic messaging client.

2. The method as recited in claim 1, wherein determining that the alternate journaling stream destination has been selected for the requesting electronic messaging client includes selecting the alternate journaling stream destination from a set of available alternate journaling stream destinations.

3. The method as recited in claim 2 further comprising causing the addition of at least one additional alternate journaling stream destination to the set of available alternate journaling stream destinations.

4. The method as recited in claim 2, wherein selecting the alternate journaling stream destination includes utilizing a round robin selection algorithm to select the alternate journaling stream destination.

5. The method as recited in claim 2, wherein the first request for addressing information and the second request for addressing information are transmitted by different messaging clients.

6. The method as recited in claim 1, wherein the configurable journaling criteria includes a combination of the threshold number of journaling stream messages that should be received at the designated journaling stream destination and the threshold amount of time in which the designated journaling stream destination can receive journaling stream messages from the set of electronic messaging clients.

7. The method as recited in claim 1, wherein evaluating the configurable journaling criteria includes obtaining a number of journaling stream messages that have been received at the designated journaling stream destination in response to obtaining on behalf of an electronic messaging client a request for address information for a journaling stream destination associated with the requesting electronic messaging client.

8. The method as recited in claim 1, wherein causing the designation of an alternate designated journaling stream destination for the set of electronic messaging clients based the evaluated configurable journaling criteria includes replacing the designated journaling stream destination with the alternate journaling stream destination.

9. The method as recited in claim 1 further comprising associating the set of electronic messaging clients with the designated journaling stream destination.

10. A method for managing electronic messages, the method comprising:
    associating a set of electronic messaging clients with a designated journaling stream destination, wherein each of the electronic messaging clients is associated with a default journaling stream destination and wherein the designated journaling stream destination is different from the default journaling stream destination for at least one electronic messaging client in the set of electronic messaging clients;
    obtaining configurable journaling criteria, the configurable journaling criteria determining at least one of a threshold number of journaling stream messages that should be received at the designated journaling stream destination or a threshold amount of time in which the designated journaling stream destination can receive journaling streams from the set of electronic messaging clients;
    evaluating the configurable journaling criteria based on at least one of a number of journaling stream messages received at the designated journaling stream destination or an amount of time in which the designated journaling stream destination has received journaling stream messages from the set of electronic messaging clients; and
    causing the designation of an alternate designated journaling stream destination for the set of electronic messaging clients based the evaluated configurable journaling criteria.

11. The method as recited in claim 10, wherein the configurable journaling criteria includes a combination of the threshold number of journaling stream messages that should be received at the designated journaling stream destination and the threshold amount of time in which the designated journaling stream destination can receive journaling stream messages from the set of electronic messaging clients.

12. The method as recited in claim 10, wherein evaluating the configurable journaling criteria includes obtaining a number of journaling stream messages that have been received at the designated journaling stream destination.

13. The method as recited in claim 10, wherein causing the designation of an alternate designated journaling stream destination for the set of electronic messaging clients based the evaluated configurable journaling criteria includes replacing the designated journaling stream destination with the alternate journaling stream destination.

14. The method as recited in claim 10, wherein the electronic messaging clients correspond to electronic mail messaging clients.

15. A system comprising:
a data store for maintaining information associating a designated journaling stream destination with a set of electronic messaging clients, wherein the designated journaling stream destination is different from a default journaling stream destination individually associated with each of the set of electronic messaging clients;
one or more computing devices having a processor and a memory, the one or more computing devices executing computer-executable instructions that cause the one or more computing devices to:
 obtain configurable journaling criteria for managing the designated journaling stream destination;
 evaluate the configurable journaling criteria; and
 cause the designation of an alternate designated journaling stream destination for the set of electronic messaging clients based at least in part on the evaluated configurable journaling criteria.

16. The system as recited in claim 15, wherein the one or more computing devices evaluate the configurable journaling criteria based on at least one of a number of electronic messages received at the designated journaling stream destination or an amount of time in which the designated journaling stream destination has received journaling streams from the set of electronic messaging clients.

17. The system as recited in claim 15, wherein the one or more computing devices determine that each of the set of electronic messaging clients should be associated with a designated journaling stream destination.

18. The system as recited in claim 15, wherein the one or more computing devices cause the designation of an alternate designated journaling stream destination by selecting an alternate designated journal stream destination from a set of available alternate designated journal stream destinations.

19. The system as recited in claim 15, wherein the one or more computing devices cause the designation of an alternate designated journaling stream destination by modifying information identifying the designated journaling stream destination with information identifying the alternate designated journaling stream destination.

20. The system as recited in claim 15, wherein the configurable journaling criteria are dynamically modified.

* * * * *